United States Patent [19]
Ghoneim

[11] Patent Number: 5,009,294
[45] Date of Patent: Apr. 23, 1991

[54] VEHICLE TRACTION CONTROL SYSTEM

[75] Inventor: Youssef A. Ghoneim, Mt. Clemens, Mich.

[73] Assignee: General Motors Corporation, Detroit, Mich.

[21] Appl. No.: 467,436

[22] Filed: Jan. 19, 1990

[51] Int. Cl.$^5$ ............................................. B60K 41/20
[52] U.S. Cl. .................................. 192/1.22; 180/197; 364/426.03
[58] Field of Search ..................... 192/1.22, 1.23, 1.24; 364/426.03; 180/197

[56] References Cited

U.S. PATENT DOCUMENTS

| | | | |
|---|---|---|---|
| 4,518,044 | 5/1985 | Wiegardt et al. | 180/197 X |
| 4,733,760 | 3/1988 | Inagaki et al. | 180/197 X |
| 4,762,196 | 8/1988 | Harada et al. | 180/197 |
| 4,765,430 | 8/1988 | Schulze et al. | 180/197 |
| 4,766,972 | 8/1988 | Takata et al. | 180/197 |
| 4,873,639 | 10/1989 | Sato et al. | 364/426.03 X |
| 4,884,651 | 12/1989 | Harada et al. | 364/426.03 X |
| 4,946,015 | 8/1990 | Browalski et al. | 192/1.23 |

FOREIGN PATENT DOCUMENTS

0083502  5/1984  Japan ............................ 364/426.03

*Primary Examiner*—Rodney H. Bonck
*Attorney, Agent, or Firm*—Howard N. Conkey

[57] ABSTRACT

A vehicle traction control system includes both driven wheel brake control and engine torque output control for limiting acceleration wheel slip. A boundary condition is identified where engine torque output control alone can be used without braking to regulate the acceleration wheel slip to any desired value. When the traction control system determines that the boundary condition is not exceeded such that engine torque output control alone is capable of preventing an excessive slip condition, only engine torque is controlled to limit wheel slip. However, when the system determines the boundary condition is such that engine torque output control alone will not prevent an excessive slip condition, the brakes of the slipping wheel is then additionally controlled to limit acceleration wheel spin.

4 Claims, 6 Drawing Sheets

VEHICLE TRACTION CONTROL SYSTEM

BACKGROUND OF THE INVENTION

This invention relates to a vehicle traction control system and, more particularly, to such a system which provides for such control by control of both the brakes of the driven wheels and engine torque output.

It is a common experience with automotive vehicles for excessive wheel slip to occur during vehicle acceleration when the operator initiated engine torque delivered to the vehicle driven wheels are such that the frictional forces between the tire and the road surface are overcome. While a small amount of slip between the tire and road surface is necessary in order to achieve a driving force, excessive slip results in the reduction of effective driving force and in the deterioration in the lateral stability of the vehicle.

Various methods have been proposed for preventing an excessive slip condition of the driven wheels of a vehicle by limiting the slip between the wheel and the road surface at a value that will achieve a maximum transfer of driving force from the driven wheels to the road surface. For example, in one method, the output power of the engine is reduced by reducing the amount of fuel delivered to the engine when an excessive slip condition is detected. In another method, the brakes of the spinning wheel are applied when the excessive slip condition is detected. In yet another known method both wheel brake application and engine output power are controlled to limit acceleration wheel spin.

In those systems in which the wheel brakes are applied to limit acceleration wheel slip, it is desirable to minimize the amount and duration of brake application so as to minimize the amount of energy being absorbed by the brakes. This is accomplished in those systems where both wheel brakes and engine output power are controlled for acceleration slip control by reduction of engine torque output either simultaneously with the application of brakes when an excessive acceleration slip condition is detected or subsequent to the application of the brakes in response to such a condition.

SUMMARY OF THE INVENTION

This invention is directed to a traction control system that includes both driven wheel brake control and engine torque output control for limiting acceleration wheel slip and in which the brake control for slip control is minimized. As opposed to those systems controlling both engine torque output and wheel brakes and in which the brakes are applied each time upon the detection of an onset of an excessive acceleration slip condition, the subject invention coordinates the brake and engine torque controls by controlling the engine torque output each time upon the detection of an onset of an excessive slip condition and controls the slipping wheel brakes to augment engine torque control only when the conditions require it to prevent excessive slip conditions.

In accord with this invention, a boundary condition is identified where engine torque output control alone can be used without braking to regulate the acceleration wheel slip to any desired value. When the traction control system determines that the boundary condition is not exceeded such that engine torque output control alone is capable of preventing an excessive slip condition, only engine torque is controlled to limit wheel slip. However, when the system determines the boundary condition is such that engine torque output control alone will not prevent an excessive slip condition, the brakes of the slipping wheel is then additionally controlled to limit acceleration wheel spin.

In one specific form of this invention, the boundary condition is defined by a maximum allowable slip value and a predetermined minimum value of the slip rate of change at which the slip trajectory will peak at the maximum allowable slip value using only engine torque output control.

In another form of the invention, the boundary condition is defined by a predetermine rate of change in the slip error relative to a desired slip value.

In one embodiment of the invention, engine torque output is controlled by controlling the position of the throttle blade regulating engine air intake.

DESCRIPTION OF THE DRAWINGS

The invention may be best understood by reference to the following description of a preferred embodiment and the drawings in which.

DESCRIPTION OF THE PREFERRED EMBODIMENT

Figure 1:
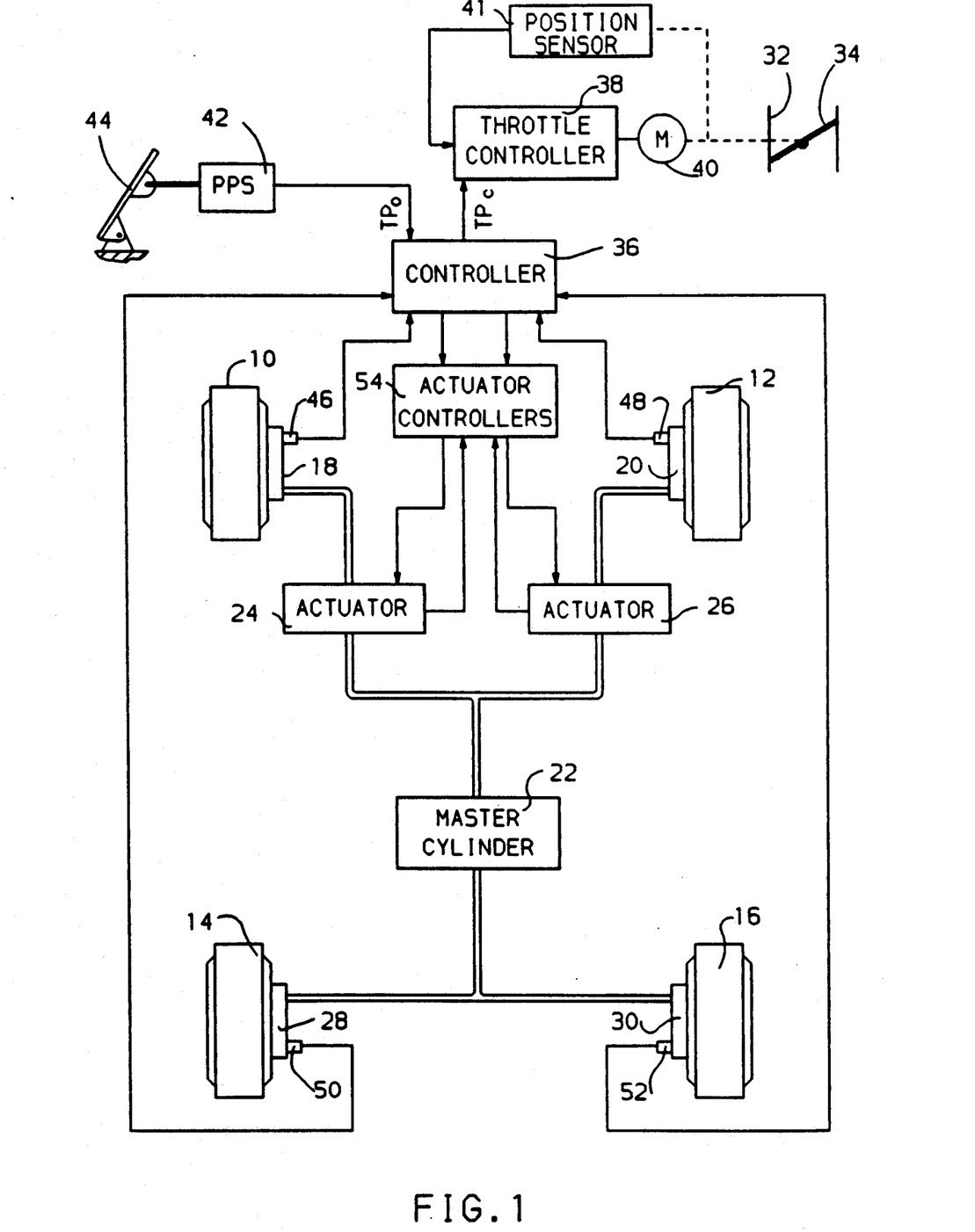
FIG. 1 is a schematic block diagram of a vehicle traction control system.

A traction control system for a front wheel drive vehicle is illustrated in FIG. 1. The vehicle has left and right front driven wheels 10 and 12 and left and right rear non-driven wheels 14 and 16. The front wheels 10 and 12 have respective hydraulic actuated brakes 18 and 20 actuated by manual operation of a conventional master cylinder 22 through a pair of traction control pressure actuators 24 and 26. When the actuators 24 and 26 are inactive, the hydraulic fluid from the master cylinder 22 passes through the actuators 24 and 26 to the brakes 18 and 20 of the wheels 10 and 12. Thus, the actuators 24 and 26 are transparent to the braking system during normal braking of the wheels 10 and 12. Similarly, the rear wheels 14 and 16 include a pair of hydraulic actuated brakes 28 and 30 operated by hydraulic fluid under pressure from the master cylinder 22 in response to manual actuation of the brakes.

The vehicle includes an internal combustion engine, not shown, having an air intake passage 32 with a throttle valve 34 therein for regulating engine air intake and therefore engine operation as is well known.

The throttle valve 34 is controlled to a commanded throttle position TPc provided by a controller 36 to a throttle controller 38 which in turn provides closed loop control of the throttle valve 34 via a motor 40 and a conventional throttle position sensor 41, such as a potentiometer monitoring the actual position of the throttle valve 34 and providing a signal representing throttle position. The throttle controller 38 is standard in form and in one embodiment may include a digital-to-analog converter for generating an analog signal representing the commanded throttle position $TP_c$ which is compared with the output of the position sensor 41 to provide control to the motor 40 to position the throttle valve 34 at the commanded position.

During normal operation of the vehicle in the absence of a detected excessive slip condition of the driven wheels 10 and 12, the throttle valve 34 is controlled to an operator commanded position $TP_o$ provided by a pedal position sensor 42 monitoring the position of the standard accelerator pedal 44 operated by the vehicle operator.

If the engine is operated so as to deliver excessive torque to the driven wheels 10 and 12, they will experience excessive slip relative to the road surface thereby reducing the tractive force and the lateral stability of the vehicle. In order to limit the acceleration slip of the driven wheels 10 and 12 resulting from excessive engine output torque, the controller 36 adjusts the commanded position $TP_c$ of the throttle valve 34 to limit the air intake through the intake passage 32 and operates the brakes of the wheels 10 and 12 if a predetermined boundary condition indicates that the slip trajectory will exceed a maximum allowable slip value. To sense the slip condition of the driven wheels, the controller 36 monitors the wheel speeds of the left and right driven wheels 10 and 1 via speed sensors 46 and 48 and the wheel speeds of the left and right undriven wheels 14 and 16 via speed sensors 50 and 52.

The controller 36 provides for controlling the engine torque output in response to a sensed onset of an excessive slip condition of one or both of the driven wheels 10 and 12 by controlling the position of the throttle valve 34 via the throttle controller 38. In this regard, the controller 36 adjusts the operator commanded throttle position $TP_o$ and provides a commanded throttle position $TP_c$ for reducing or limiting the engine torque output for controlling acceleration slip. If the controller 36 determines that brake control is required to assist the control of engine torque in limiting acceleration wheel slip, the actuators 24 and 26 are operated via actuator controllers 54 for braking the left, right or both of the driven wheels 10 and 12 experiencing an excessive slipping condition to limit the slipping condition.

Figure 2:
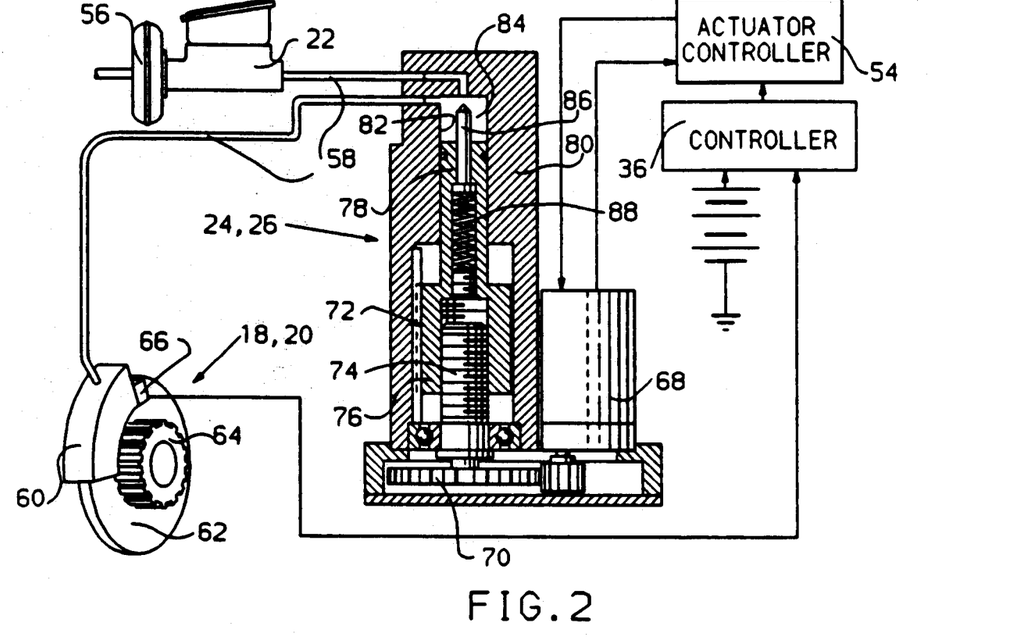
FIG. 2 is a view of the brake pressure modulator for controlling wheel brake pressure for limiting wheel slip.

Referring to FIG. 2, there is illustrated a braking system for one of the driven wheels 10 or 12 including the corresponding actuator 24 or 26 controlled by the controller 36 for limiting slip of the driven wheel. In general, the braking system is composed of a hydraulic boost unit 56 and brake lines 58 providing fluid communication with the wheel brake 18,20. The wheel brake is illustrated as a disc brake system that includes a caliper 60 located at a rotor 62 of the vehicle wheel.

A wheel speed sensing assembly at each wheel is generally comprised of an exciter ring 64 which is rotated with the wheel and an electromagnetic sensor 66 which monitors the rotation of the exciter ring to provide a signal having a frequency proportional to wheel speed. The wheel speed signals are provided to the controller 36 to be used to determine the wheel speed.

The actuator 24,26 is illustrated in the inactive position wherein it is transparent to the braking system. This is the actuator condition during normal vehicle braking. Each actuator includes a DC torque motor 68 whose output shaft drives a gear train 70 whose output turns a ball screw actuator 72 comprised of a linear ball screw 74 and nut 76. As the linear ball screw rotates, the nut 76 is either extended or retracted thereby positioning a piston 78 which forms a part of the nut 76. Each actuator includes a housing 80 in which a cylinder 82 is formed. The piston 78 is reciprocally received in the cylinder 82 and defines therewith a chamber 84. The cylinder 82 has an inlet which is connected to the master cylinder 22 and an outlet which is coupled to the brake caliper 60 of the wheel brake.

A valve member 86 is carried by and extends from the end of the piston 78. This member is spring-biased within the piston 78 to an extended position as shown by a spring 88. When the piston 78 is in the retracted position illustrated, the fluid path between the master cylinder 22 and the wheel brake 18 is open. When, however, the ball screw 74 is rotated by the motor 68 to extend the nut 76 and therefore the piston 78, the valve member 86 is seated against the opening at the inlet to the chamber 84 from the master cylinder 22 to isolate the chamber 84 and the wheel brake 60 from the master cylinder 22. Once the valve 86 is seated, further extension of the piston 78 by rotation of the motor 68 then functions to pressurize the fluid at the brake 18 to apply braking forces to the wheel. The value of the current through the DC motor 68 is proportional to the wheel brake pressure and can be considered a measure thereof.

The ball screw actuator 72 is a high efficiency actuator so that the ball screw 74, gear train 70 and the motor output shaft are reverse driven by the hydraulic pressure acting on the piston 78 when it is greater than the torque output of the motor 68 until the hydraulic pressure is reduced to a level where it is overcome or offset by the torque output of the DC motor 68.

Figure 3:
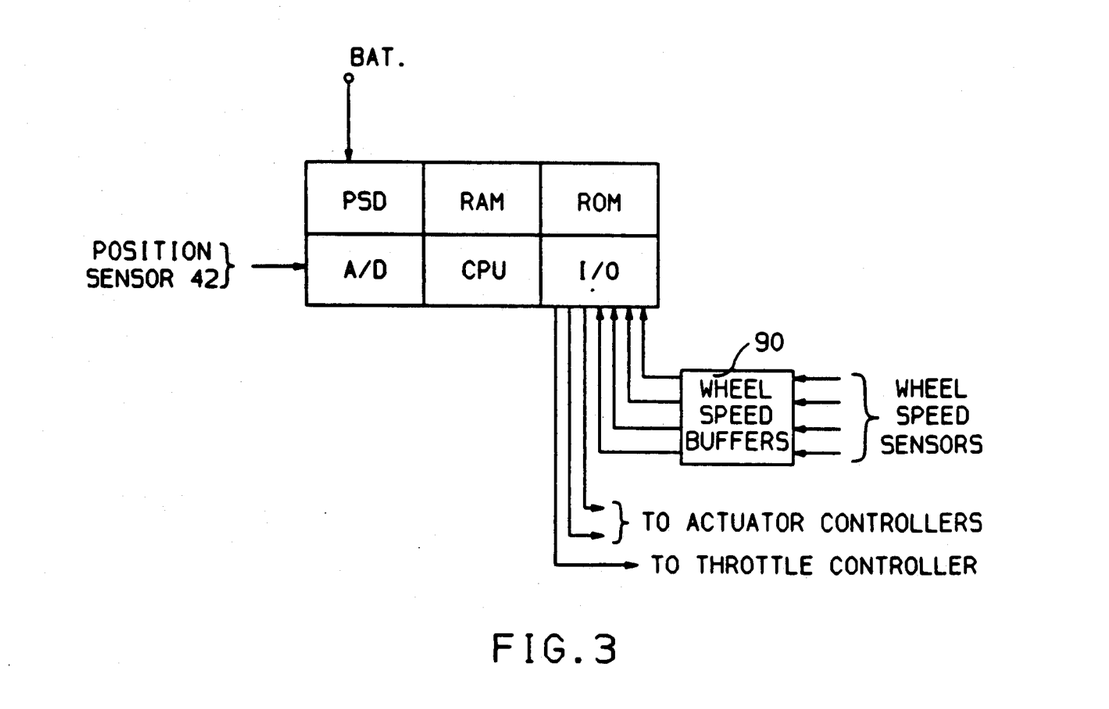
FIG. 3 is a diagram of the traction controller of FIG. 1 for controlling wheel brake pressure and for controlling the air flow into the intake of the vehicle engine for regulating engine torque output in accord with this invention.

The controller 36 of FIG. 1 takes the form of a conventional general purpose digital computer programmed to control the slip of the driven wheels 10 and 12 in accord with the principles of this invention. As illustrated in FIG. 3, the controller 36 consists of a common digital computer composed of a read-only memory (ROM), a random access memory (RAM), an analog-to-digital converter (A/D) that converts the analog output of the position sensor 42 to a digital signal, a power supply device (PSD), a central processing unit (CPU) and an input/output section (I/O), which interfaces to the actuator controllers 54, the throttle controller 38 and a wheel speed buffer circuit 90 which functions to condition the speed signal outputs of the wheel speed sensors.

The actuator controllers 54 take the form of two conventional independent closed loop motor current controllers, each of which establishes the current through the motor 68 of a respective one of the actuators 24 or 26 at a level commanded by the controller 36.

Figure 4:
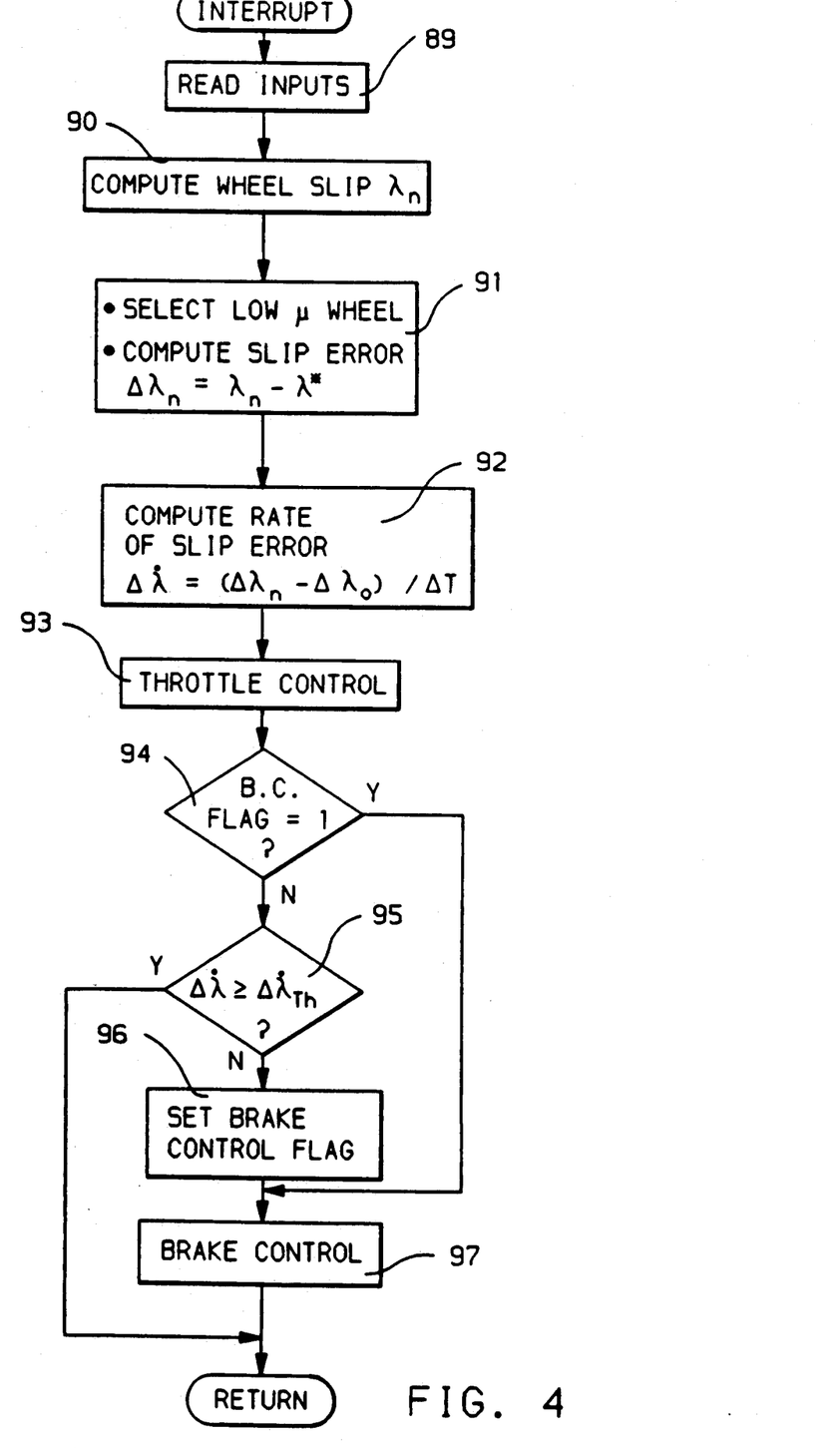
FIGS. 4, 5, 6A and 6B are flow diagrams illustrating the operation of the traction controller of FIG. 1.
Figure 5:
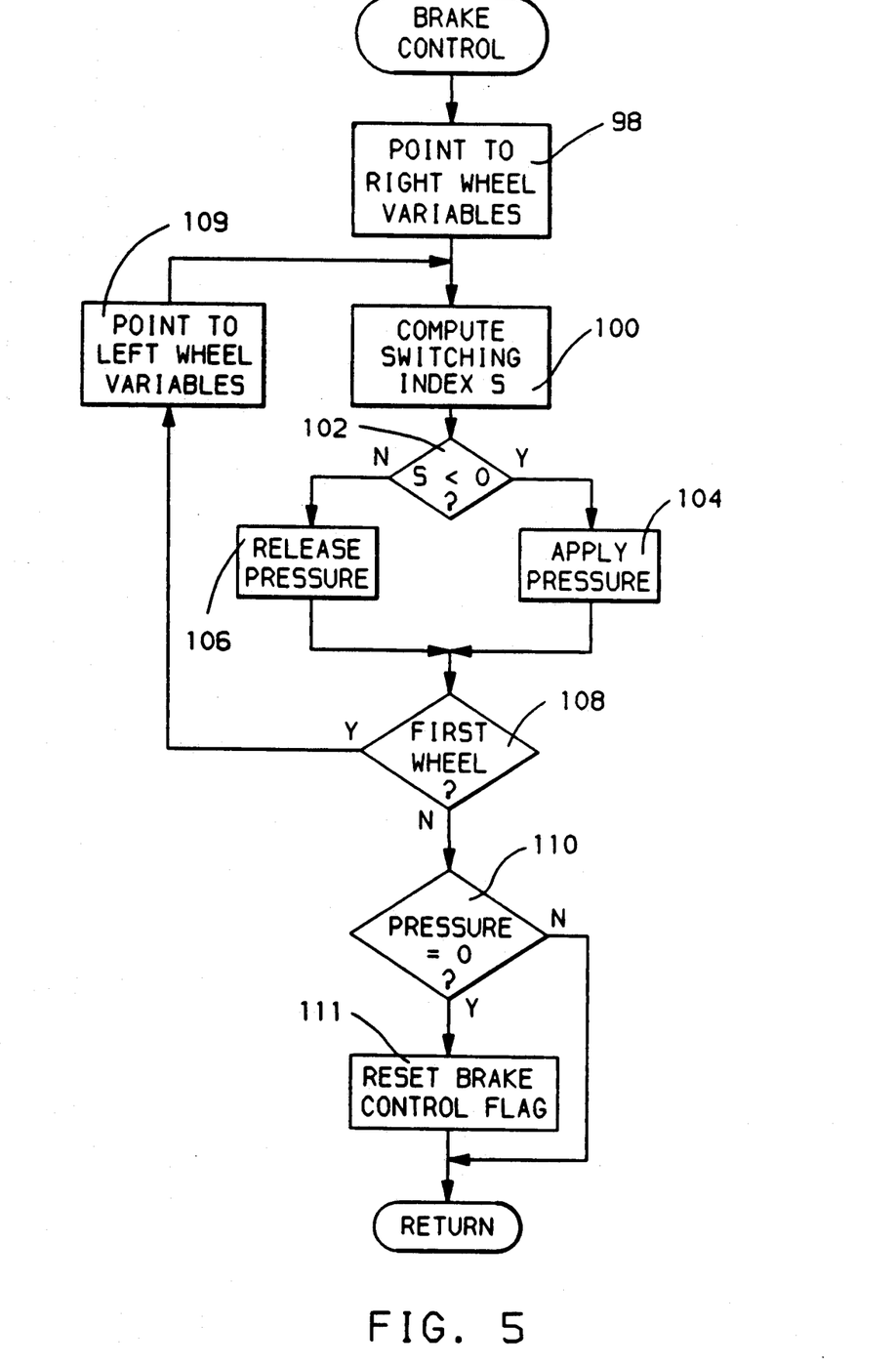
Figure 6A:
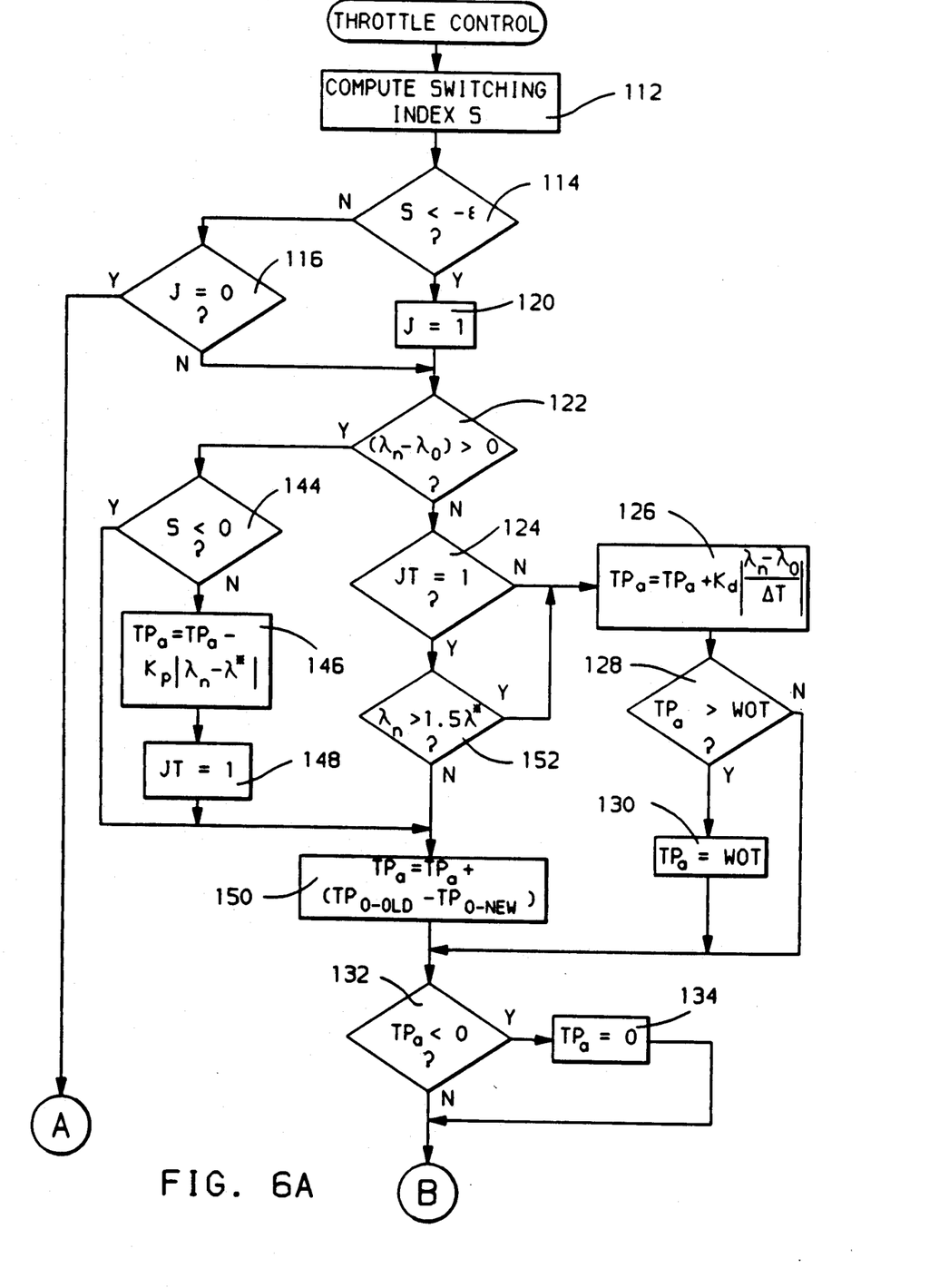
Figure 6B:
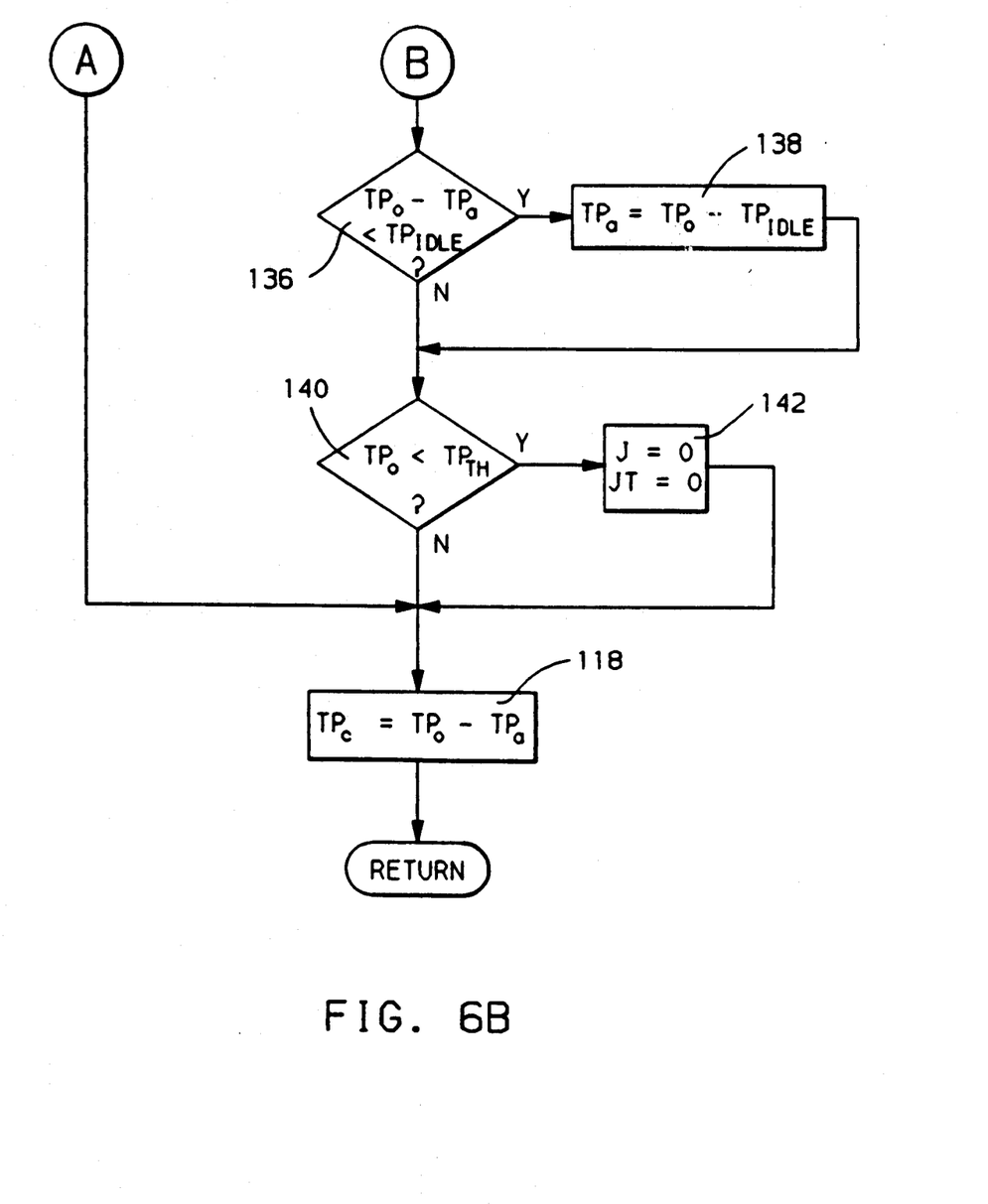

The ROM of the digital computer of FIG. 3 contains the instructions necessary to implement the control algorithm as diagrammed in FIGS. 4–6 in addition to calibration constants utilized in controlling acceleration slip. The flow diagram function blocks of FIGS. 4–6 describe the general task or process being executed by the controller 36 at that point. The specific programming of the ROM for carrying out the functions depicted in the flow diagrams of FIGS. 4–6 may be accomplished by standard skill in the art using conventional information processing languages.

While the digital computer of FIG. 3 may take any conventional form, one such form may be the single chip Motorola microcomputer MC-68HC11. Alternatively, multiple processors or other circuit forms may be employed. For example, a separate microcomputer may be employed to measure wheel speed and develop various wheel state variables.

Referring to FIG. 4, a control cycle interrupt routine for controlling the position of the throttle valve 34 in accord with operator demand and for limiting the acceleration slip of the driven wheels 10 and 12 is illustrated. This routine is executed by the controller 36 at constant interrupt intervals established by an internal timing circuit. For example, the interrupt routine of FIG. 4 may be executed at 10 millisecond intervals.

Upon receipt of a control cycle interrupt, the controller 36 reads the various system inputs at step 89 including the four wheel speeds and the operator commanded throttle position $TP_o$ provided by the pedal position sensor 42. From the measured values of wheel speed, the slip $\lambda_n$ of each of the driven wheels is computed at step 90. In this embodiment, slip $\lambda_n$ of each wheel is determined in accord with the expression $(\omega_v - \omega_d)/\omega_d$ where $\omega_d$ is the speed of the driven wheel and $\omega_v$ is the speed of the vehicle as represented by the speed of a hypothetically unbraked wheel. In one embodiment, $\omega_v$ may be represented by the speed of the undriven wheel on the same side of the vehicle as the wheel whose slip is being determined. In another embodiment, $\omega_v$ may be the average of the speeds of the two undriven wheels 14 and 16. It should here be noted that the computed acceleration slip value is negative. Step 90 also saves as $\lambda_o$ for each respective driven wheel the wheel slip values computed during the prior execution of the interrupt routine.

Step 91 then selects the wheel on the lowest coefficient of friction surface (the wheel having the greatest magnitude of slip $\lambda_n$) and computes the current slip error $\Delta\lambda_n$ for the selected wheel in accord with the expression $$\Delta\lambda_n = \lambda_n - \lambda^*$$

where $\lambda^*$ is a desired acceleration slip. $\lambda^*$ generally is a slip value at which the wheel tractive force is a maximum and above which the tractive force decreases and wheel slip rapidly increases. The sign of $\Delta\lambda_n$ is negative when the magnitude of the acceleration slip is greater than the desired slip value. Step 91 further saves as $\Delta\lambda_o$ the slip error computed during the prior execution of the interrupt routine.

At the next step 92, the rate of slip error $\Delta\lambda$ is computed in accord with the expression $$\Delta\lambda = (\Delta\lambda_n - \Delta\lambda_o)/\Delta T$$

where $\Delta T$ is the duration of the interrupt interval (10 ms in this embodiment). The rate of slip error will be negative if the magnitude of slip error is increasing.

The interrupt routine then executes a throttle control routine 93 which controls the position of the throttle blade 34 in response to the operator actuation of the pedal 44 and controls the throttle position 34 for limiting engine torque output in response to a detected excessive slip condition.

The routine next determines if a predetermined boundary condition has been exceeded to determine whether engine torque control via step 93 alone will be effective to prevent wheel slip from exceeding a predetermined maximum allowable slip value $\lambda_x$. This boundary condition is a predetermined calibrated condition stored in ROM that is a limit condition whereat the slip trajectory will peak at the maximum allowable slip value $\lambda_x$ using only engine torque output control via step 93. In this embodiment, the boundary condition is represented by a predetermined threshold $\Delta\lambda_{Th}$ of the rate of slip error. If the rate of slip error is greater than this threshold (a smaller magnitude, keeping in mind the negative sign of the rate of slip error when the magnitude of slip is increasing), the slip trajectory with only engine torque control via step 93 will not exceed the maximum allowable magnitude $\lambda_x$ so that only engine torque control is required for acceleration slip control. If the rate of slip error is greater than this threshold, a condition exists whereat engine torque control alone will not be able to prevent the wheel slip from exceeding the maximum allowable value $\lambda_x$.

In another embodiment, the boundary may be represented by a predetermined threshold $\lambda_m$ of the rate of change in slip $\lambda$. If the rate of change in slip is less than $\lambda_m$, (magnitude greater than the magnitude of $\lambda_m$), a condition exists whereat engine torque control will not be able to prevent the wheel slip from exceeding the maximum allowable value $\lambda_x$. Conversely, if the rate of change in slip is greater than $\lambda_m$, only engine torque control is required for acceleration slip control.

The routine first samples the state of a brake control flag at step 94 to determine whether or not the boundary condition had previously been exceeded thereby calling for control of brake pressure for acceleration wheel slip control. A reset state indicates that the routine had not previously called for application of driven wheel brakes for acceleration wheel slip control. Assuming initially that the flag is reset, step 95 is executed to determine if the boundary condition has been exceeded thereby indicating a need for driven wheel brake control. In this embodiment, the boundary condition is based on the rate of slip error. If the rate of slip error $\Delta\lambda$ is greater than or equal to $\Delta\lambda_{Th}$, the slip trajectory using engine torque alone will be adequate to prevent the wheel slip from exceeding the maximum allowable value $\lambda_x$ and the program exits the routing without providing for wheel brake control.

If, however, step 95 determines that the boundary condition is exceeded indicating the situation where engine torque control alone will not prevent an excessive slip condition, the program proceeds to step 96 where the brake control flag first referred to at step 94 is set to indicate the enabling of brake pressure control for acceleration slip control. Thereafter, a brake control routine of step 97 is executed which actuates the brake of a wheel experiencing excessive slip to assist the throttle control routine 93 in controlling acceleration wheel slip.

During subsequent executions of the interrupt routine of FIG. 4 and until the brake control flag is again reset, the program will proceed directly from step 94 to the brake control routine 97. Therefore, in this embodiment, the brake control routine will be continually enabled once enabled by the setting of the brake control flag for the remainder of the period of the present slip control action.

Referring to FIG. 5, the brake control routine 97 is first illustrated. This routine provides for independent control of the pressure of each of the driven wheels 10 and 12 in response to its own slip condition. At the step 98, the routine points to the variables associated with one of the driven wheels 10 or 12 here illustrated as the right wheel. Thereafter at step 100, a switching index S for the selected wheel is computed. This switching index S represents a slip condition of the wheel and is utilized to determine whether or not an excessive slip condition exists. The index S is computed in accord with the expression $$S = C\lambda + (\lambda_n - \lambda^*)$$

where C is a calibration constant (typically in a range from 0.03 to 0.075) or a variable in another embodiment, $\lambda_n$ is the slip of the selected wheel computed at step 90 of FIG. 4, $\lambda$ is the rate of change in slip of the selected wheel, and $\lambda^*$ is the target or desired slip value referred to at step 91. From this expression it can be seen that the switching index representing the slip condition is a function of the rate of change in slip and the slip error relative to a desired slip value. It can be seen that when the slip is not changing and is at the desired value, the switching index S will have a value equal to zero and the wheel tractive force is a maximum. However, when the switching index has a value less than zero (keeping in mind that slip is negative when the driven wheel speed exceeds the undriven wheel speed) an excessive slip condition is indicated. Conversely, when the value of the switching index S is greater than zero, a slip condition less than optimum is indicated.

In line with the foregoing, if at the next step 102 the value of the switching index S is determined to be less than zero, indicating an excessive slip condition, the program proceeds to a step 104 where the routine provides for increasing the pressure applied to the brake 20 of the right wheel 12. This is accomplished by incrementing the command current delivered to the actuator controller 54 for commanding an increase in the current to the actuator 26. The result is an incremental increase in the pressure applied to the wheel brake 20 of the right wheel 12. Conversely, if the value of the switching index S is greater than zero indicating the slip condition is less than optimum, the program proceeds to a step 106 where it provides for a release in the pressure applied to the wheel brake 20 of the right wheel 12. This is accomplished by decrementing the current command to the actuator controller associated with the actuator 26.

From steps 104 and 106, the program proceeds to a step 108 where it determines whether or not the brake control routine has been executed for each of the right and left driven wheels. If the routine has been executed only once in the present interrupt interval indicating that the routine has been executed only in reference to one of the two wheels, the program proceeds to a step 109 where the program is conditioned to execute the routine in reference to the other one of the two wheels. In this embodiment where the routine was first conditioned for the right wheel, step 109 points to the left wheel variables after which the steps 100-106 are executed in relation to the left wheel 10 using variables associated with the left wheel for controlling the left wheel brake 18 to maintain the slip thereof at the optimum level. Thereafter at step 108, the program determines if the brake pressure command for both wheels are zero. If not, indicating brake control is still active in at least one wheel for controlling acceleration wheel slip, the program exits the routine.

In the event that the wheel for which the brake control routine is conditioned is not experiencing an excessive slip condition as determined at step 102, the pressure will be released at step 106 with each execution of the interrupt routine of FIG. 4 until the command pressure is zero. Thereafter, the command is limited to zero and the pressure actuator is set in its transparent mode as illustrated in FIG. 2 to enable normal operation of the vehicle brakes by the vehicle operator. When step 110 determines the brake pressure command for both wheels are zero, the brake control flag is reset at step 111 to initialize the interrupt routine for responding to another acceleration slip condition as described in regard to FIG. 4. Thereafter the program exits the routine of FIG. 5.

Referring to FIGS. 6A and 6B, the throttle control routine 93 of FIG. 4 is illustrated. This routine provides for control of throttle position in accord with the operator commanded value $TP_o$ and for control of engine torque output based on wheel slip for acceleration slip control. The routine when entered proceeds to a step 112 where the value of a switching index S is computed for each wheel in identical manner as the computation at step 100 of FIG. 5 in relationship to the brake control routine and the switching index representing the greatest magnitude of acceleration wheel slip is selected. This then represents the slip condition of the driven wheel on the lowest coefficient of friction road surface. The same expression may be used in step 112 as in step 100 in which case step 112 simply recalls the one of the switching indexes computed at step 100 of FIG. 5 representing the greatest magnitude of acceleration slip. Thereafter, the parameters associated with the corresponding wheel will be used in the remainder portion of the throttle control routine.

The value of the switching index S established by step 112 is compared with a calibration constant threshold value $-\epsilon$ below which an excessive acceleration slip condition is indicated. Assuming first that the switching index S is not less than the threshold value $-\epsilon$, the state of a flag J is sampled at step 116. As will be described, this flag indicates whether or not an excessive slip condition as represented by the switching index had previously been experienced and engine torque is being regulated for acceleration slip control. Assuming that an excessive slip condition has not yet been experienced, the program proceeds to a step 118 where a throttle position command value $TP_c$ is generated for controlling the position of the throttle blade 30. This command is determined in accord with the expression $$TP_c = TP_o - TP_a$$

where $TP_a$ is an adjustment to the operator commanded throttle position $TP_o$ for slip control. Since an excessive slip condition has not occurred, $TP_a$ is zero resulting in the throttle position command $TP_c$ being equal to the operator command $TP_o$. Accordingly, the position of the throttle blade 30 is controlled by the throttle controller 38 to the operator commanded position $TP_o$.

The foregoing steps are continually repeated with each execution of the interrupt routine of FIG. 4 to maintain the position of the throttle blade 34 equal to the operator commanded throttle position. However, if the computed switching index value becomes less than the threshold $-\epsilon$ indicating an excessive slip condition, the program proceeds to a step 120 where the flag J is set to indicate throttle control the routine is regulating engine torque output for acceleration slip control.

Generally, as the wheel slip exceeds the desired value $\lambda^*$ at which the tractive force is a maximum, the tractive force begins to decrease and wheel slip rapidly increases. In order to prevent large excursions in wheel slip, a rapid reduction in engine torque is required. This condition is sensed at step 122 which determines whether or not the magnitude of the slip is increasing.

This is determined by comparing the difference $\lambda_n - \lambda_o$ with zero where $\lambda_n$ is the latest computation of wheel slip and $\lambda_o$ is the prior computation of wheel slip. If this difference is not greater than zero indicating the magnitude of slip is increasing (keeping in mind that $\lambda$ is negative when the driven wheels are slipping), the program proceeds to a step 124 where the state of a JT flag is sensed. This flag is normally in a reset state when an excessive slip condition is first sensed and is set when the excessive slip condition is first arrested. Assuming initially that the JT flag is at the normal initial reset condition, the program proceeds to a step 126 where a throttle position adjustment value $TP_a$ is determined in accord with the rate of change in wheel slip. This value is determined in accord with the expression $$TP_a = TP_a + K_d |(\lambda_n - \lambda_o)/\Delta t|$$

where $\Delta t$ is the interrupt interval of the interrupt routine of FIG. 4 and $K_d$ in one embodiment is a calibration constant typically between 1.5 and 0.3 and in another embodiment a variable as a function of a determined road surface coefficient of friction. The throttle angle adjustment value $TP_a$ is later utilized at step 118 to decrease the commanded throttle position $TP_c$ to reduce the engine torque in order to arrest the excessive slip condition. It can be seen that the expression derived at step 126 provides for a derivative adjustment of the commanded throttle position which provides for a significant correction to the engine torque before the magnitude of the slip condition becomes very large.

Returning to step 126, the throttle position adjustment value is next limited to a value equal to a wide open throttle amount. This is accomplished by comparing the throttle position adjustment $TP_a$ to a wide open throttle value WOT at step 128 and limiting the value to the wide open throttle value at step 130. Next the routine prevents the throttle position adjustment from increasing the operator commanded throttle position resulting in more engine torque output than requested by the vehicle operator. This is accomplished by comparing $TP_a$ to zero at step 132 and if less than zero (having the effect of increasing the throttle position beyond the operator commanded position at step 118), the throttle angle adjustment is limited to zero at step 134.

To prevent the throttle position command $TP_c$ from establishing a throttle angle less than an idle position, the adjusted operator commanded position is limited to an idle throttle position $TP_{idle}$ by steps 136 and 138. If step 136 determines the adjustment would result in a throttle position less than the idle position $TP_{idle}$, the throttle angle adjustment $TP_a$ is limited at step 138 to the difference between the operator commanded throttle position $TP_o$ and the idle throttle position $TP_{idle}$.

The routine next provides for initializing the system in preparation for another sensed excessive slip condition whenever the operator commanded throttle position $TP_o$ is reduced to below a low threshold position $TP_{TH}$. This is accomplished by comparing the operator commanded angle $TP_o$ with the threshold value $TP_{TH}$. If the throttle angle is less than this threshold as determined at step 140, the flags J and JT are each reset at step 142 to condition the routine for again responding to an excessive acceleration slip condition.

Returning to step 114, once the J flag was set at step 120 when the excessive slip condition was first sensed, the program subsequently proceeds to step 122 even though the switching index S becomes greater than the threshold $-\epsilon$. As long as the magnitude of slip continues to increase as determined at step 122, the steps 124-130 are repeated with each execution of the throttle control routine as set forth above to continue to provide the derivative adjustment of step 126 to the throttle position to reduce engine torque output. When, as a result of the derivative adjustment initiated to arrest the excessive slip condition the magnitude of slip no longer is increasing as determined by step 122, the program proceeds from step 122 to a step 144 where the switching index value S is compared to a second threshold such as zero above which it is desired to increase engine torque to maintain the optimum slip value $\lambda^*$. This threshold may in other embodiments be equal to $+\epsilon$ or any other desired value. If the switching index value S is less than the threshold of step 144, the throttle position is maintained and the program proceeds to a step 150 to be described. When the switching index value becomes greater than the threshold level utilized at step 144 indicating the magnitude of the slip condition is less than desired, the program proceeds to a step 146 where the throttle angle adjustment is varied as a function of slip error in accord with the expression $$TP_a = TP_a - K_p |\lambda_n - \lambda^*|$$

where $K_p$ in one embodiment is a calibration constant typically between 0.5 and 2.5 and in another embodiment a variable as a predetermined function of a determined road surface coefficient of friction, vehicle speed and the transmission gear ratio. As can be seen, this provides for a proportional adjustment to the throttle angle adjustment value $TP_a$ in a direction to restore the wheel slip to the desired value. In general, when the magnitude of wheel slip decreases as vehicle speed increases after the increase in slip is rapidly halted by the aforementioned derivative control, the throttle position is not immediately adjusted as the switching index becomes greater than $-\epsilon$ as a result of the deadband defined by the respective thresholds of steps 114 and 144.

From step 146, the program next proceeds to a step 148 where the JT flag is set to indicate that the throttle angle is being increased in order to restore the slip condition to the optimum condition whereat the switching index S is equal to zero. As will be described, the function of this JT flag is to prevent a subsequent derivative adjustment of the throttle angle adjustment value $TP_a$ when the slip begins to increase in response to the increased throttle angle resulting from the step 146.

Step 150 accounts for the fact that the vehicle operator may have made an adjustment to the position of the pedal 44 resulting in a change in the operator commanded throttle position $TP_o$. The step 150 corrects the throttle angle adjustment by the amount already made by the operator. This is accomplished by adjusting the throttle angle adjustment value $TP_a$ by the difference between the operator commanded throttle angle position $TP_{o\text{-}old}$ determined at the prior execution of the throttle control routine and the present operator commanded value $TP_{o\text{-}new}$.

From step 150, the limitations established via steps 132-138 are imposed as previously described on the throttle angle adjustment value after which the commanded throttle position $TP_c$ is determined at step 118 and provided to the throttle controller 38.

If as a result of one or more executions of the step 146 during repeated executions of the interrupt routine of FIG. 4 the magnitude of wheel slip should again increase as sensed at step 122, the program proceeds to the step 124 where the condition of the JT flag is sensed. If set, it indicates that the wheel slip increase has been arrested after the slip first exceeded the threshold value $-\epsilon$ and a proportional adjustment to increase the throttle angle has been made at step 146 to restore slip to the desired value $\lambda^*$. In order to prevent possible control oscillations, it is not desirable to then make an immediate derivative adjustment to the throttle angle in the opposite direction to reduce the throttle angle. If allowed to happen, a potential oscillatory condition may result in the control of the throttle angle. Accordingly, the program proceeds from step 124 to a step 152 where the wheel slip value $\lambda_n$ is compared with some value greater than the desired slip value $\lambda^*$ such as 1.5 $\lambda^*$.

If the slip is within a predetermined range of the desired slip (in this embodiment 1.5 $\lambda^*$), the program proceeds directly from step 152 to step 150 after which the program proceeds as previously described. However, if the last determined slip value $\lambda_n$ is less than 1.5 $\lambda^*$ (representing a slip that is 1.5 times larger than the desired slip value), the program proceeds to provide a derivative adjustment to the throttle angle via execution of the step 126 as previously described.

The foregoing steps are repeatedly executed to maintain the switching index in a range between zero and $-\epsilon$ established at steps 114 and 144. If at any time step 140 determines that the throttle position commanded by the vehicle operator becomes less than the predetermined constant calibration threshold $TP_{TH}$, the system is initialized to the initial state at step 142 such that the program proceeds from step 114 to 116 and then to 118 to provide throttle position control in accord with the operator commanded value as previously described.

The foregoing description of a preferred embodiment of the invention for the purpose of illustrating the invention is not to be considered as limiting the invention since many modifications may be made by the exercise of skill in the art without departing from the scope of the invention.

The embodiments of the invention in which an exclusive property or privilege is claimed are defined as follows:

1. A traction control method for a vehicle having an engine for applying a driving torque to a driven wheel and having a brake for braking the driven wheel, the method comprising the steps of:
    determining a wheel slip condition of the driven wheel;
    controlling the driving torque applied to the driven wheel by the engine, when the determined wheel slip condition represents an excessive acceleration wheel slip condition, in direction to limit wheel slip to a desired slip value $\lambda^*$;
    determining a condition where using only the step of controlling the driving torque would be incapable of preventing a trajectory of wheel slip from exceeding a predetermined maximum allowable slip value $\lambda_x$; and
    controlling the brake for braking the driven wheel when it is determined that the step of controlling the driving torque would be incapable of preventing the trajectory of wheel slip from exceeding the predetermined maximum value $\lambda_x$.

2. The traction control method of claim 1 wherein the step of controlling the brake controls the brake in direction to limit wheel slip to the desired value $\lambda^*$.

3. The traction control method of claim 2 wherein the step of determining a condition where using only the step of controlling the driving torque would be incapable of preventing the trajectory of wheel slip from exceeding a predetermined maximum allowable slip value $\lambda_x$ includes:
    determining wheel slip $\lambda_n$;
    determining slip error $\Delta\lambda_n$ in accord with the expression $\Delta\lambda_n = \lambda_n - \lambda^*$; and
    determining a rate of change $\Delta\lambda$ in the determined slip error $\Delta\lambda_n$,
    the condition where using only the step of controlling the driving torque would be incapable of preventing the trajectory of wheel slip from exceeding a predetermined maximum allowable slip value $\lambda_x$ being represented by the determined rate of change $\Delta\lambda$ in the determined slip error exceeding a predetermined threshold value $\Delta\lambda_{Th}$.

4. The traction control method of claim 1 wherein the step of determining a condition where using only the step of controlling the driving torque would be incapable of preventing the trajectory of wheel slip from exceeding a predetermined maximum allowable slip value $\lambda_x$ includes:
    determining wheel slip $\lambda_n$;
    determining the rate of change $\lambda$ in the determined wheel slip $\lambda_n$,
    the condition where using only the step of controlling the driving torque would be incapable of preventing the trajectory of wheel slip from exceeding a predetermined maximum allowable slip value $\lambda_x$ being represented by the determined rate of change $\lambda$ exceeding a predetermined threshold value $\lambda_m$.

* * * * *